United States Patent
Shahar et al.

(10) Patent No.: US 7,403,714 B2
(45) Date of Patent: Jul. 22, 2008

(54) ALL OPTICAL CHROMATIC AND POLARIZATION MODE DISPERSION CORRECTORS

(75) Inventors: Arie Shahar, Rye Brook, NY (US); Eldan Halberthal, Rye Brook, NY (US)

(73) Assignee: Main Street Ventures LLC, White Plains, NY (US)

( * ) Notice: Subject to any disclaimer, the term of this patent is extended or adjusted under 35 U.S.C. 154(b) by 540 days.

(21) Appl. No.: 10/834,343

(22) Filed: Apr. 29, 2004

(65) Prior Publication Data

US 2004/0202483 A1  Oct. 14, 2004

Related U.S. Application Data (63) Continuation-in-part of application No. 10/827,314, filed on Apr. 20, 2004, application No. 10/834,343, which is a continuation-in-part of application No. 10/826,363, filed on Apr. 19, 2004, now Pat. No. 7,136,557, which is a continuation-in-part of application No. 10/472,244, filed as application No. PCT/US02/09969 on Mar. 28, 2002, application No. 10/834,343.

(60) Provisional application No. 60/467,563, filed on May 5, 2003, provisional application No. 60/465,237, filed on Apr. 25, 2003, provisional application No. 60/464,351, filed on Apr. 22, 2003.

(51) Int. Cl.
H04J 14/02 (2006.01)
H04B 10/12 (2006.01)
H04B 10/00 (2006.01)

(52) U.S. Cl. .......................... 398/81; 398/147; 398/159
(58) Field of Classification Search .................. 398/29, 398/81, 147–150, 159
See application file for complete search history.

(56) References Cited

U.S. PATENT DOCUMENTS

| | | | |
|---|---|---|---|
| 6,304,691 B1* | 10/2001 | Espindola et al. | 385/24 |
| 6,563,620 B1* | 5/2003 | Hakimi et al. | 398/141 |
| 6,778,782 B1* | 8/2004 | Watley et al. | 398/147 |
| 6,937,793 B2* | 8/2005 | Lelievre et al. | 385/37 |
| 2002/0018267 A1* | 2/2002 | Sun et al. | 359/161 |
| 2002/0034360 A1* | 3/2002 | Ishii | 385/37 |
| 2002/0041618 A1* | 4/2002 | Watanabe et al. | 372/76 |
| 2003/0161568 A1* | 8/2003 | El-Refaei et al. | 385/11 |
| 2003/0223689 A1* | 12/2003 | Koch et al. | 385/37 |
| 2004/0207902 A1* | 10/2004 | Koch et al. | 359/301 |

* cited by examiner

Primary Examiner—Dalzid Singh
(74) Attorney, Agent, or Firm—EMPK & Shiloh, LLP (57) ABSTRACT

The present invention provides an all optical system for correcting optical dispersions including at least one optical chopping device having an input terminal for receiving a first signal, which has been broadened by optical dispersions and corresponds to an optical information channel, and at least one output terminal, wherein the optical chopping device is arranged to produce in the at least one output a second signal that is narrower than the first signal. The second signal may be detectable more reliably than the first signal.

24 Claims, 5 Drawing Sheets

ALL OPTICAL CHROMATIC AND POLARIZATION MODE DISPERSION CORRECTORS

CROSS-REFERENCE TO RELATED APPLICATIONS

This application claims the benefit of U.S. Provisional Patent Application Ser. No. 60/467,563, filed May 5, 2003, entitled "All Optical Chromatic and Polarization Mode Dispersion Correctors".

In addition this application is a Continuation-In-Part of U.S. patent application Ser. No. 10/472,244, filed Sep. 22, 2003, entitled "Optical Pulse Chopper", which is a National Phase of PCT International Application PCT/US02/09969, filed Mar. 28, 2002, entitled "Optical Pulse Chopper".

In addition this application is a Continuation-In-Part of U.S. patent application Ser. No. 10/826,363, filed Apr. 19, 2004, now U.S. Pat. No. 7,136,557 entitled "All Optical Chopping For Shaping and Reshaping Apparatus And Method", which claims the benefit of U.S. Provisional Patent Application Ser. No. 60/464,351, filed Apr. 22, 2003, entitled "All Optical Chopping For Shaping and Reshaping Apparatus And Method".

In addition this application is a Continuation-In-Part of U.S. patent application Ser. No. 10/827,314, filed Apr. 20, 2004, entitled "All Optical Chopping Using Logic Gates Apparatus And Method", which claims the benefit of U.S. Provisional Patent Application Ser. No. 60/465,237, filed Apr. 25, 2003, entitled "All Optical Chopping Using Logic Gates Apparatus And Method".

FIELD OF THE INVENTION

The invention relates to optical shaping, optical reshaping, optical communication devices and systems, in particularly to optical shapers and choppers for all-optical corrections and compensations of Chromatic Dispersion (CD) and Polarization Mode Dispersion (PMD).

BACKGROUND OF THE INVENTION

In the field of optical communication there is a strong demand for optical shaping and reshaping of optical signals to achieve high speed transmission of optical information at a very high quality and very low Bit Error Rate (BER).

The implementation of ultra fast optical communication network faces, among other challenges, a need to maintain high quality optical signals along significant distances for keeping very low BER. At high transmission rates, the pulse quality of the optical pulses degrades very rapidly in a relatively short distance due to pulse broadening caused by CD and PMD.

The broadening phenomenon of optical pulses, in radiation guides, caused by CD is due to the dependency of the propagation speed on the wavelength. The longer is the wavelength the faster is the propagation speed. The optical pulses have a spectral width $\Delta\lambda$ of wavelengths-around the central peak wavelength $\lambda_{center}$. Each wavelength in the spectrum of the wavelengths, related to the optical pulses, propagates at different speed, resulting with pulses broadening. The amount of broadening depends linearly on the traveling length L, the relation between the wavelength and the refractive index described by the slope factor K, and the spectral width $\Delta\lambda$ of the pulses.

The broadening process of optical pulses in radiation guides caused by PMD is due to the dependency of the propagation speed on the polarization orientation. Due to production imperfections, the optical fibers have fast and slow propagation axes that are orthogonal. The polarization vector of the optical pulses may have components along the fast and the slow axes. Accordingly, each component of the polarization vector propagates at different velocity and results with broadening of the pulses. In addition, temporal environmental influences may affect the orientation of the fast and the slow axes and may cause changes in the pulses broadening and in the polarization orientation of the pulses.

The PMD dispersions may include first and second orders dispersions corresponding to the broadening of the polarization modes by chromatic dispersions and depolarizations, respectively.

The broadening of the pulses may cause adjacent pulses to overlap each other such that they cannot be resolved for the purpose of information reading. This process is known as Inter Symbol Interference (ISI). The broadening limit of the pulses is the maximum width of the pulses in which the BER exceeds a certain upper limit allowed. The broadening limit for CD and PMD is about 20% and 10%, respectively. In addition to the BER, there is another criterion of measuring the signal quality known as power penalty. The signal quality and the power penalty are determined according to the increasing power factor (measured in dB) needed to be used in order to restore the detection quality (BER) of signals corrupted by dispersions and to bring it into the detection quality of undistorted signals or signals with a certain detection level determined by a certain BER.

Accordingly, if no correction is used to compensate for the pulse broadening caused by the CD and the PMD, many Optical-Electrical-Optical (OEO) regenerators should be distributed along the propagation path in order to regenerate new narrow pulses wherever the broadening of the pulses exceeds the limit that the system can tolerate. OEO regenerators are very expensive and complicated and thus dramatically increase the network cost in terms of infrastructure initial cost and maintenance cost. In addition, the OEO regenerators reduce the network reliability.

There are several methods and techniques designed for CD compensation based on a fiber that produces a process that is opposite to the CD process, i.e., negative CD. According to these techniques, the compensation fiber creates a process in which the longer (and faster) wavelengths are delayed with respect to the shorter (and slower) wavelengths. The length of the compensation fiber is adjusted to produce the compensation needed for bringing the optical pulses back into their original width. However, when such CD compensation may be effective around a certain wavelength, it is very hard to produce dispersion management in which the CD compensation is effective for multiple wavelengths such as used with Dense Wavelength Division Multiplexing (DWDM). Thus, usually the CD compensation is not effective for all the wavelengths used. In addition, even where the CD compensation is effective, these methods provide local correction to the CD, but they do not contribute anything for decreasing the CD effect along further propagation post to the CD correction.

The problem that PMD creates becomes dominant at bit rates above 10 Gbps. At such bit rates, the accepted amount of broadening is normally less than 10%.

Compensating for PMD is more complex than compensating for CD due to the manifold of parameters (like temperature, small imperfections of the fiber, etc.), which may change over time and interact in an unpredictable way, resulting in an inherent randomness of this phenomenon. In addition, PMD does not scale linearly with the traveling length L, but with its square root.

SUMMARY OF THE INVENTION

It is an object of the present invention to provide all optical pulse shapers and re-shapers to improve the quality of pulses broaden by CD and PMD that are wavelength insensitive.

It is another object of the present invention to provide all optical pulse shapers and re-shapers to improve the quality of pulses broaden by PMD that may be phase insensitive.

Yet another object of the present invention is to provide all optical systems including pulse shapers and re-shapers to improve the quality of pulses, broadened by CD and PMD, which have very fast response and operate on the fly.

Still another object of the present invention is to provide all optical systems including pulse shapers and re-shapers to improve the quality of pulses, broadened by CD and PMD, by narrowing the broaden pulses back into their original width in a process that reduces the further broadening caused by CD (and/or PMD) post to their corrections.

Exemplary embodiments of the present invention provide an all optical system for correcting optical dispersions include at least one optical chopping device having an input terminal for receiving a first signal, which has been broadened by optical dispersions and corresponds to an optical information channel, and at least one output terminal, wherein the optical chopping device is arranged to produce in the at least one output a second signal that is narrower than the first signal. The second signal may be detectable more reliably than the first signal.

BRIEF DESCRIPTION OF THE DRAWINGS

The present invention will be understood and appreciated more fully from the following detailed description of exemplary embodiments of the invention, taken in conjunction with the accompanying drawings in which.

DETAILED DESCRIPTION OF THE INVENTION

Figure 1A:
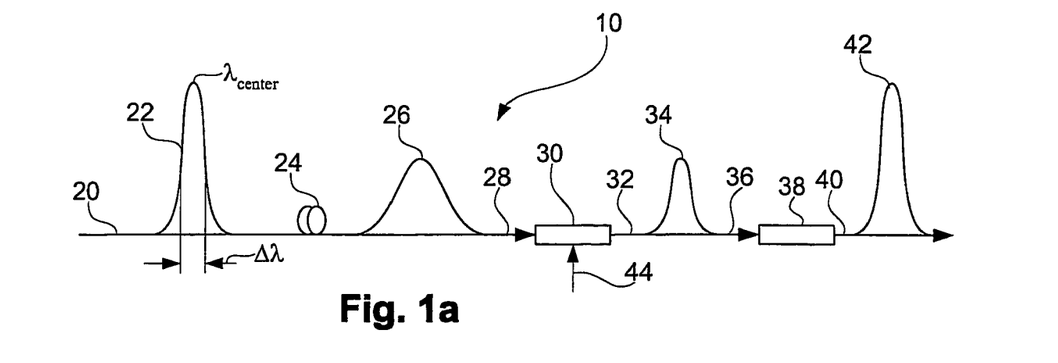
FIGS. 1a-1c are schematic illustrations of CD, PMD, and both CD and PMD correctors including optical pulse choppers.
Figure 1B:
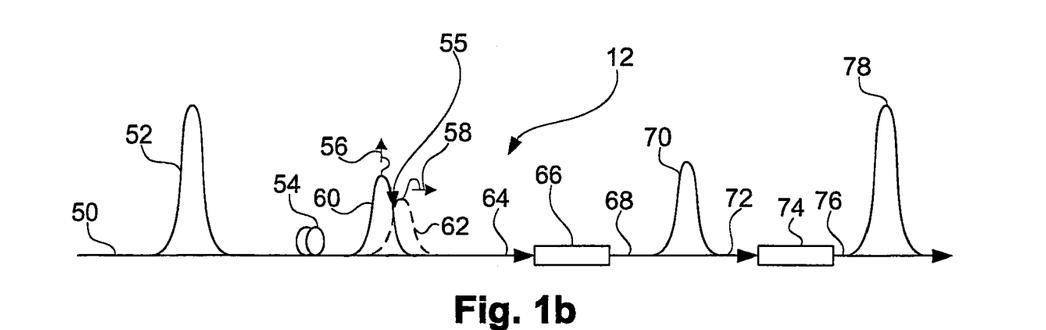
Figure 1C:
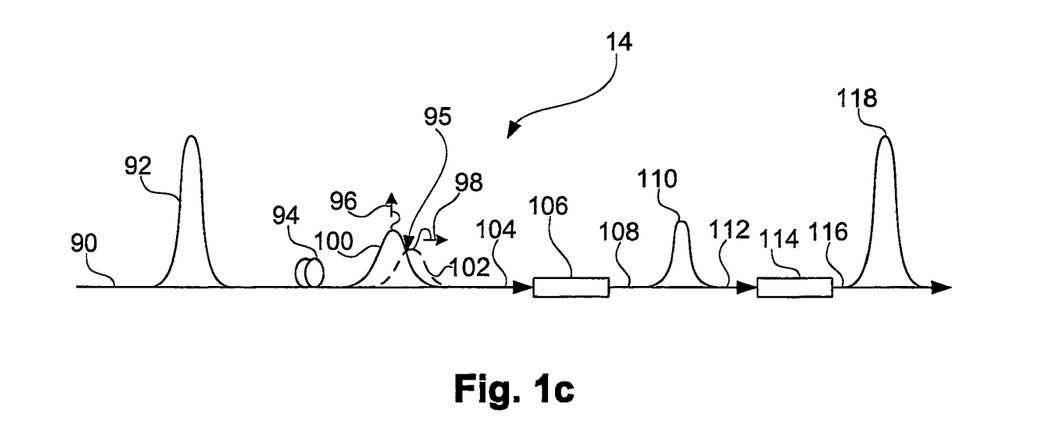

FIGS. 1a, 1b, and 1c illustrate all-optical correctors (compensators) 10, 12, and 14, respectively, used for CD and PMD compensation. Choppers 30, 66, and 106 of FIGS. 1a, 1b, and 1c, respectively, represent any all-optical shaper, re-shaper, and chopper and particularly the all-optical shapers, re-shapers, and choppers disclosed in PCT Publication WO02079838 of International Application PCT/US02/09969, filed Mar. 28, 2002, entitled "Optical Pulse Chopper", U.S. patent application Ser. No. 10/826,363, filed Apr. 19, 2004, entitled "All Optical Chopping For Shaping And Reshaping, Apparatus And Method", and U.S. patent application Ser. No. 10/827,314, filed Apr. 20, 2004, entitled "All Optical Chopping Using Logic Gates Apparatus And Method", the disclosures of all which applications are incorporated herein by references in their entirety. According to the disclosures of the above-referenced applications, choppers 30, 66, and 106 may be all-optical choppers of any of the following types:

1. Choppers that include interference devices;
2. Choppers that include coincidence gates;
3. Choppers that include logic gates;
4. Choppers that include logic AND gates;
5. Choppers that include optical thresholds;
6. Choppers that include coincidence gates with delay-lines;
7. Choppers that include loop-mirrors with non linear elements (NLE);
8. Choppers that includes summing gates with optical threshold;
9. Choppers that include Mach Zhender Interferometers (MZI);
10. Choppers that operate with non-coherent light;
11. Choppers that operate with coherent light;
12. Choppers that are phase insensitive;
13. Choppers that are wavelength insensitive;
14. Choppers that include closed loop phase control;
15. Self all-optical choppers;
16. External choppers;
17. Choppers that produce head chopping;
18. Choppers that produce tail chopping;
19. Choppers that produce head and tail chopping;
20. Choppers that produce symmetric head and tail chopping;
21. Choppers that perform the optical chopping on the fly;
22. Choppers with very fast time response;
23. Choppers that the amount of their chopping is adjustable, and
24. Choppers that the amount of their chopping is adjustable and is controlled according to the measured amount of the dispersions 1. Single Channel CD and PMD Correctors FIGS. 1a-1c illustrate dispersion correctors (compensators) for a single optical channel. FIG. 1a illustrates a CD corrector 10 including an all-optical chopper 30 having input 28 and output 32 that may be connected to input 36 of optical amplifier 38 having output 40. Radiation guide 20 carries input signal 22 along a relatively long propagation path, schematically illustrated by coil 24. Pulse 22 is a high quality signal such as a signal produced by a generator or a regenerator (not shown). Signal 22 has a spectral width $\Delta\lambda$ around the central peak wavelength $\lambda_{center}$. During the propagation of pulse 22 along fiber 20 it is broaden by the CD and appears as broaden pulse 26 at input 28 of chopper 30. As explained above, the amount of broadening between pulse 22 and pulse 26 is linearly dependent, among other parameters, on the length L of fiber 20 represented by coil 24. The length L is chosen to be less than the maximum length allowed $L_{max}$ in which the broadening of pulse 22 into pulse 26 exceeds the maximum limit allowed.

Broaden pulse 26 is received, by chopper 30 at its input 28. Chopper 30 chops pulse 26 and emits the narrower chopped pulse, from its output 32, as pulse 34 which is narrower than pulse 26 and its spectral, $\Delta\lambda$, width is similar to the spectral width of original pulse 22. Pulse 34 may be received by optical amplifier 38 at its input 36 for producing, at its output 40, amplified signal 42. Signal 42 may have a width similar to the width of original pulse 22.

Pulse 22 may suffers loss on its propagation along guide 20 till it arrives as pulse 26 to chopper 30. In addition, chopper 30 chops out part of the energy of pulse 26 for converting it into narrower pulse 34. Accordingly, amplifier 38 may be used for amplifying pulse 34 into pulse 42 to compensate for the loss in guide 20 or chopper 30 associated with the traveling of pulse 22 along guide 20 and the conversion of pulse 26, by chopper 30, into narrower pulse 34. When using a chopper of the type illustrated and described in U.S. patent application entitled "All Optical Chopping For Shaping and Reshaping Apparatus And Method" (see background cross-reference) where the chopper includes a Non Linear Element (NLE) which is an optical amplifier, the chopping is associated with intensity gain that compensates for the various loss such as the loss discussed above. In such a situation, there may be no need for amplifier 38.

The broadening of pulse 22, by the CD, into broaden pulse 26 is symmetric. The shortest and the longest wavelengths in the spectrum of pulse 22 are the most delayed and the most advanced, respectively. Thus, the longest and the shortest wavelengths in the spectrum of pulse 26 are located in its head and tail, respectively. Due to the symmetric structure of pulse 26, a head and tail symmetric chopping may be used by chopper 30. The head and tail chopping that may be performed by chopper 30 removes the longest and the shortest wavelength in the spectrum of pulse 26. Accordingly, chopper 30 acts not just as a chopper that narrows pulse 26 into pulse 34 but, it also acts as a filter that narrows the spectrum width $\Delta\lambda$ of pulse 26 by removing the longest and the shortest wavelengths from the spectrum of pulse 26. As mentioned above, the broadening of the optical pulse, caused by the CD, is linearly proportional to the spectral width of the pulse. Accordingly, the spectral width of pulse 34 or 42, which is narrower than the spectral width of pulse 22, enables pulse 34 or 42, having time width similar to the time width of original pulse 22, to propagate further with reduced broadening caused by the CD.

Input 44 of chopper 30 may be used to operate chopper 30 as an external chopper that receives an output signal at input 44. The signal at input 44 may be synchronized with pulse 26 at input 28. For the simplicity of the illustrations, it should be clear that even when a chopper, such as choppers 66 and 106 of FIGS. 1b and 1c, is illustrated without an input, such as, input 44 of FIG. 1a used for receiving external signal, it still may represent both, self chopper and external chopper.

FIG. 1b illustrates PMD corrector 12 including all-optical chopper 66 having input 64 and output 68 that may be connected to input 72 of an optical amplifier 74 having output 76. Radiation guide 50 carries input signal 52 along a relatively long propagation path, schematically illustrated by coil 54. Pulse 52 is a high quality signal such as a signal produced by a generator or a regenerator (not shown). Signal 52 has a polarization orientated along a certain direction that may have components along the fast and the slow polarization axes of guide 50. Accordingly, each component propagates at a different propagation velocity resulting, after a distance L, with a broaden pulse 55. Pulse 55 includes leading mode (fast mode) 62 that its polarization is oriented along the fast polarization axis 58 and delayed mode (slow mode) 60 that its polarization is oriented along the slow axis 56. The existing of two displaced polarization modes 60 and 62 produces the broadening of pulse 55 which is known as PMD. The amount of broadening between pulse 52 and pulse 55 depends among other parameters, on the length L of fiber 50 represented by coil 54. The length L is chosen to be less than the maximum length allowed $L_{max}$ in which the broadening of pulse 52 into pulse 55 exceeds the maximum limit allowed by the designing rules of the networks.

Broaden pulse 55 is received, by chopper 66 at its input 64. Chopper 66 chops pulse 55 and emits chopped pulse 55, from its output 68, as pulse 70 which is narrower than pulse 55 and its width is similar to the width of original pulse 52. Pulse 70 may be received by optical amplifier 74 at its input 72 for producing, at its output 76, amplified signal 78. Signal 78 may have a width similar to the width of original pulse 52.

Pulse 52 may suffers loss on its propagation along guide 50 till it arrives as pulse 55 to chopper 66. In addition, chopper 66 chops out part of the energy of pulse 55 for converting it to pulse 70. Accordingly, amplifier 74 may be used for amplifying pulse 70 into pulse 78 to compensate for the loss in guide 50 or chopper 66 associated with the traveling of pulse 52 along guide 50 and the conversion of pulse 55, by chopper 66, into narrower pulse 70. When using a chopper of the type illustrated and described in U.S. patent application entitled "All Optical Chopping For Shaping and Reshaping Apparatus And Method" (see background cross-reference) where the chopper includes a Non Linear Element (NLE) which is an optical amplifier, the chopping is associated with intensity gain that compensates for the various loss such as the loss discussed above. In such a situation, there may be no need for amplifier 74.

The broadening of pulse 52, by the PMD, into broaden pulse 55 includes a displacement between two polarization modes (modes 60 and 62) and thus the broadening may be with asymmetric shape. Due to the possible asymmetric structure of pulse 55, a head or tail chopping may be performed to remove part of the polarization mode having the smaller amplitude. The choice between the head or the tail chopping depends on the appearance of the small amplitude mode. If the small amplitude mode leads (such as mode 62 illustrated by FIG. 1b), head chopping may be used; if this small amplitude mode is the delayed mode, tail chopping may be used. In case that there is no way to predict if the polarization mode with the smaller amplitude is ahead or delayed, a symmetric or asymmetric chopping including head and tail chopping may be used by chopper 66.

FIG. 1c illustrates CD and PMD compensator 14 including chopper 102 and may include amplifier 114 connected in series to chopper 106. Radiation guide 90 having length represented by coil 94 carries high quality signal 92 that degrades along its travel in guide 90 and appears as broaden pulse 95 at input 104 of chopper 106. Pulse 95 includes two displaced polarization modes 102 and 100. As explained above in the description of FIG. 1b in regards to PMD, modes 102 and 100 are the polarization components of pulse 95 propagating along the fast and the slow polarization axes 98 and 96, respectively. In addition and as explained in the description to FIG. 1a in regard to CD broadening, there is also CD broadening of each of modes 102 and 100.

Broaden pulse 95 is received, by chopper 106 at its input 104. Chopper 106 chops pulse 95 and emits chopped pulse 95, from its output 108, as pulse 110 which is narrower than pulse 95 and its width is similar to the width of original pulse 92. Pulse 110 may be received by optical amplifier 114 at its input 112 for producing, at its output 116, amplified signal 118. Signal 118 may have a width similar to the width of original pulse 92.

Pulse 92 may suffers loss on its propagation along guide 90 till it arrives as pulse 95 to chopper 106. In addition, chopper 106 chops out part of the energy of pulse 95 for converting it to pulse 110. Accordingly, amplifier 114 may be used for amplifying pulse 110 into pulse 118 to compensate for the loss in guide 90 or chopper 106 associated with the traveling of pulse 92 along guide 90 and the conversion of pulse 95, by chopper 116, into narrower pulse 110. When using a chopper of the type illustrated and described in U.S. patent application entitled "All Optical Chopping For Shaping and Reshaping Apparatus And Method" (see background cross-reference) where the chopper includes a Non Linear Element (NLE) which is an optical amplifier, the chopping is associated with intensity gain that compensates for the various loss such as the loss discussed above. In such a situation, there may be no need for amplifier 114.

Chopper 106 may be head, tail, or head and tail chopper. Chopper 106 is unique in its ability to compensate, simultaneously, for both CD and PMD.

Amplifiers 38, 74, and 114 of FIGS. 1a-1c may be of the type of Solid state Optical Amplifier (SOA), Linear Optical Amplifier (LQA), Erbium Doped Fiber Amplifier (EDFA), and Raman amplifier.

Choppers 30, 66, and 106 of FIGS. 1a-1c may be of the type that is phase insensitive and where they are constructed from wavelength in sensitive components, such as wavelength in sensitive couplers, each of them may be used for CD and PMD compensation across a wide band of wavelengths, such as the band of wavelengths used in DWDM. When using SOA as the NLE of choppers 30, 66, and 106, they may have a very short time response and thus may chop pulses at a very high rate, on the fly, by self chopping or by external chopping.

Figure 2:
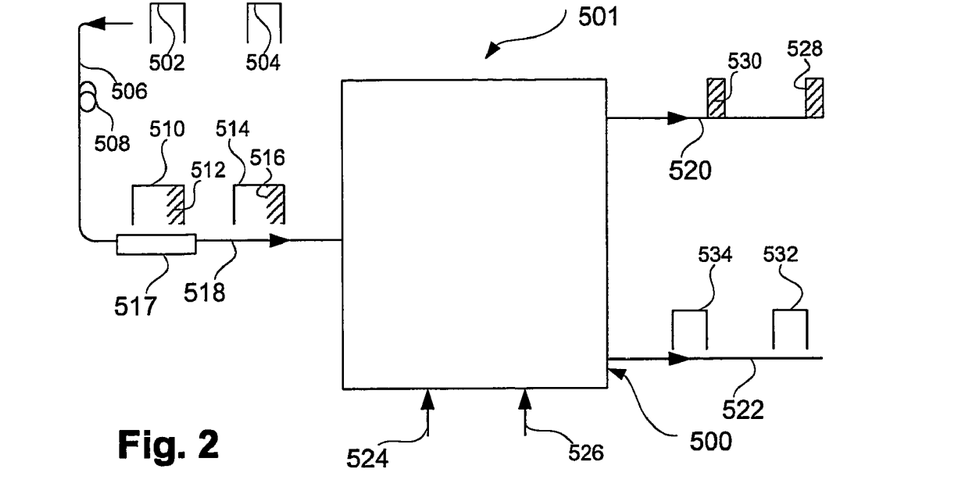
FIG. 2 is a schematic illustration of a dispersion correcting system for a single information channel including a chopper that may be used with Return-to-Zero (RZ) modulation format.

2. Dispersion Correction for Return-to-Zero Modulation Format 2.1 Single Channel CD and PMD Correctors FIG. 2 illustrates CD and PMD corrector 501 including chopper 500. Chopper 500 may be of any type, including any of the types mentioned above and in particular the type of choppers described in U.S. patent application entitled "All Optical Chopping For Shaping and Reshaping Apparatus And Method" (see background cross-reference) and illustrated there by FIGS. 6a, 6b, 7a, 7b, 8, 13a-13c, 14a-14e, 15a, 16, 17, and 18. Corrector 501 may include amplifier 517 connected in series to the input port of chopper 500. Radiation guide 506 having length represented by coil 508 carries high quality signals 502 and 504 generated by high quality modulator (not shown). Signals 502 and 504 may be the pulses of an information channel generated by Return-to-Zero (RZ) modulation format. Signals 502 and 504 may degrade along their travel in guide 506 and appear as respective broaden pulses 514 and 510 at input 518 of chopper 500. Pulses 510 and 514 include respective broaden portions 512 and 516 caused by any type of dispersions in guide 506.

Chopper 500 has two outputs 520 and 522. As explained in U.S. patent application entitled "All Optical Chopping For Shaping and Reshaping Apparatus And Method" (see background cross-reference) and illustrated there by FIGS. 6a, 6b, 7a, 7b, 8, 13a-13c, 14a-14e, 15a, 16, 17, and 18, output 520 of chopper 500 receives the signal reflected back into input 518 of chopper 500 and is coupled from there, by a coupler or a circulator, into output 520. Thus we refer to output 520 as the reflecting output. Reflecting output 520 performs chopping and the width of the signals at reflecting output 520, illustrated by pulses 528 and 530, is equal to the width of respective signals 514 and 510, at input 518, less a fixed amount of chopping determined by the setting of chopper 500. As explained in U.S. patent application entitled "All Optical Chopping For Shaping and Reshaping Apparatus And Method" (see background cross-reference) and illustrated there by FIGS. 17 and 18, chopper 500 is capable of performing variable chopping and the amount of chopping that chopper 500 produces may be selected by adjusting the positions (by variable optical delay lines) and or the gains of the NLE's that chopper 500 includes. Adjusting the gains of the NLE's of chopper 500 is performed by adjusting the current injected to these NLE's through injection-current terminals 524 and 526.

The amount of chopping that chopper 500 produces may be adjusted to be equal to broaden portions 512 and 516 of pulses 510 and 514, respectively. It should be understood that broaden portions 512 and 516 of pulses 510 and 514, respectively, are schematic illustration of the pulse broadening and indicate the width difference between the original width of pulses 504 and 502 and the width of pulses 510 and 514 broaden by dispersions, respectively. While the broaden portions 512 and 516 are illustrated as being only in the head parts of pulses 510 and 514, respectively, they may appear in the tails, in the heads, and in both the tails and the heads of pulses 510 and 514 as well.

Output 522 of chopper 500 receives signals 510 and 514 transmitted from input 518 and chopped by chopper 500. Thus we refer to output 522 as the transmitting output. Transmitting output 522 performs a fixed amount of chopping and the width of the signals at transmitting output 522 illustrated by respective pulses 534 and 532 is fixed and independent on the width of signals 510 and 514 at input 518 of chopper 500. However the width of signals (pulses) 532 and 534 is determined by the setting of chopper 500 as explained above with reference to U.S. patent application entitled "All Optical Chopping For Shaping and Reshaping Apparatus And Method" (see background cross-reference). Chopper 500 may be capable of performing variable chopping and the amount of chopping that chopper 500 produces may be adjusted to be equal to the original width of pulses 510 and 514 prior to their broadening by optical dispersions as illustrated by original pulses 502 band 504, respectively.

In such a case, once the width of pulses 532 and 534 is adjusted to be in the desired width, namely at the original width of respective pulses 502 and 504, chopper 500 produces fixed width pulses 532 and 534 which is independent on the amount of broadening 512 and 516 caused by dispersions along guide 506. This means that for correcting the broaden portions 512 and 516 caused by the dispersions, there is no need for a dynamic adjustment of the amount of chopping of chopper 500 to be according to the broaden portions 512 and 516 of pulses 510 and 514. In this case and when RZ modulation format is used to carry the information in the information channel, transmitting output 522 produces dispersion correction by converting the width of the RZ pulses 510 and 514 back into a fixed width that may be equal to the original width of the RZ pulses 504 and 502, respectively.

It should be understood that while broaden portions 512 and 516 may be at the heads, tails and both heads and tails of pulses 510 and 514, the chopping performed by chopper 500 for correcting the dispersions may be of the type of head, tail, and both head and tail chopping, regardless of the type of broadening of portions 512 and 516.

The ability of transmitting output 522 to accurately correct, even without dynamic adjustment of the chopping, broaden portions 512 and 516 caused by dispersion of pulses modulated by RZ modulation format, makes transmitting output port 522 a very attractive port for dispersion correction of RZ format modulated pulses and streams.

2.2 CD and PMD Compensators for DWDM Systems

Figure 3:
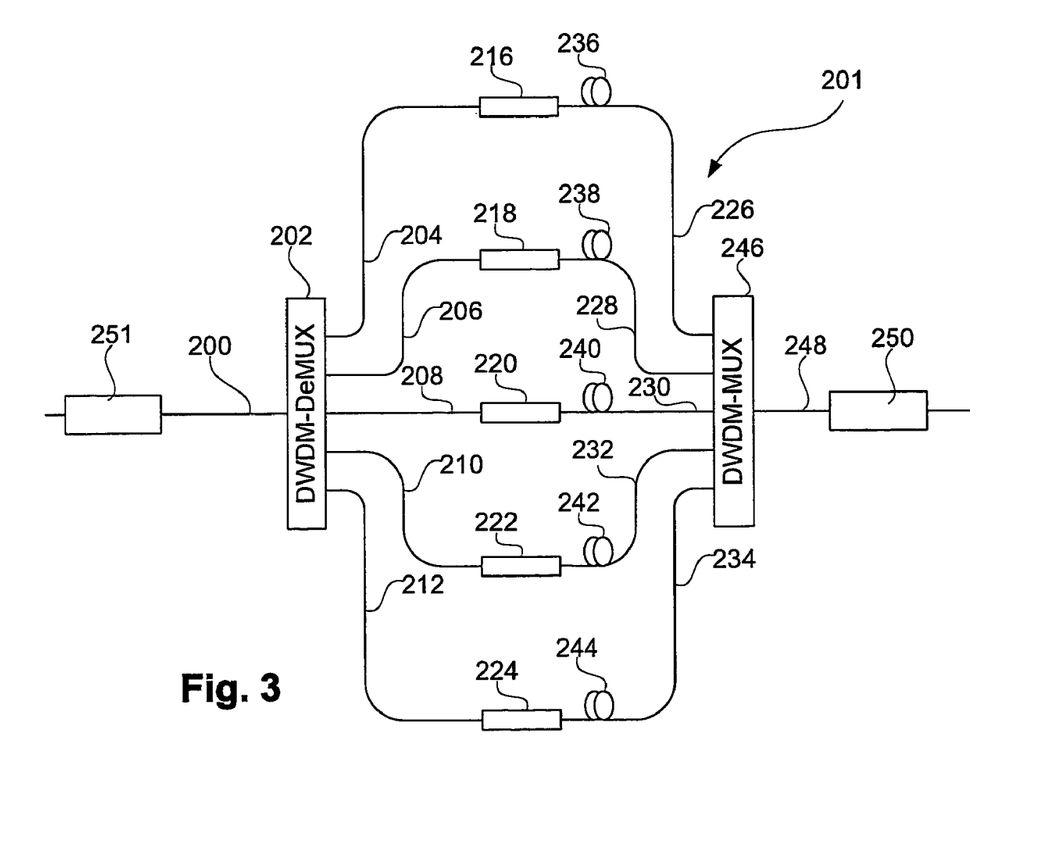
FIG. 3 is a schematic illustration of a system for correcting CD and PMD of multiple information channels including multiple choppers of FIG. 2 for multiple wavelengths in a DWDM configuration using multiplexing and demultiplexing.

FIG. 3 illustrates CD, PMD, or CD and PMD compensator system 201 for multiple channels, such as, DWDM system. System 201 may be designed especially for dispersion compensation of pulses modulated by RZ format. Radiation guide 200 may carry pulses broaden by CD and PMD of multiple information channels corresponding to multiple wavelengths which are divided, by DWDM demultiplexer 202, into multiple ports 204, 206, 208, 210, and 212; each of them carries a single wavelength corresponding to a single information channel. Radiation guide 200 may include optical amplifier 251 to compensate for the loss in guide 200, chopping loss, and demultiplexing loss caused by demultiplexer 202. Ports 204, 206, 208, 210, and 212 include pulse choppers 216, 218, 220, 222, and 224, respectively, each of them may be of the type of chopper 500 illustrated by FIG. 2. In this case and for RZ format, each of ports 204, 206, 208, 210, and 212 is analogue and similar to input 518 of chopper 500 in FIG. 2 and the broaden pulses chopped by choppers 216, 218, 220, 222, and 224, propagate, with their narrower form, in radiation guides 226, 228, 230, 232, and 234, each of them analogue and similar to transmitting output 522 of chopper 500 in FIG. 2. Radiation guides 226, 228, 230, 232, and 234 may include delay-lines 236, 238, 240, 242, and 244, respectively. In a situation of dispersion compensation for pulses modulated by RZ format, the narrower chopped pulses arriving from guides 226, 228, 230, 232, and 234 may have a fixed width and are recombined by DWDM multiplexer 246 that recombines the separated channels from guides 226, 228, 230, 232, and 234 back into a single fiber 248.

In case that the multiplexing by multiplexer (combiner) 246 should be done in a certain time sequence between the different channels arriving from guides 226, 228, 230, 232, and 234, respective delay-lines 236, 238, 240, 242, and 244 may be included in the corresponding guides to adjust the desired arrival time of each channel received from these guides.

Each of choppers 216, 218, 220, 222, and 224 at ports 204, 206, 208, 210, and 212, respectively, operates in the channel that it belong to as a compensator for CD and PMD for a single channel as illustrated and explained above for choppers 30, 66, and 106 of FIGS. 1a-1c. In case that RZ modulation format is used and choppers 216, 218, 220, 222, and 224 are of the type of chopper 500 of FIG. 2, only the inputs 204, 206, 208, 210, and 212 that are the analogue of input 518 of chopper 500 of FIG. 2 and the transmitting ports 226, 228, 230, 232, and 234 that are the analogue of transmitting port 522 are used. The reflecting outputs that are the analogue of reflecting output 520 are not in use and are not shown.

It can be seen that CD, PMD, or CD and PMD compensation system 201 receives, at its input 200, multiple information channels including broaden pulses at multiple wavelengths and system 201 emits, at its output 248 reshaped multiple information channels narrower pulses corresponding to the pulses that it receives at its input 200.

Output 248 may include optical amplifier 250 to amplify the chopped pulses that it receives in output 248 to compensate for propagation and chopping loss of these pulses.

Figure 4:
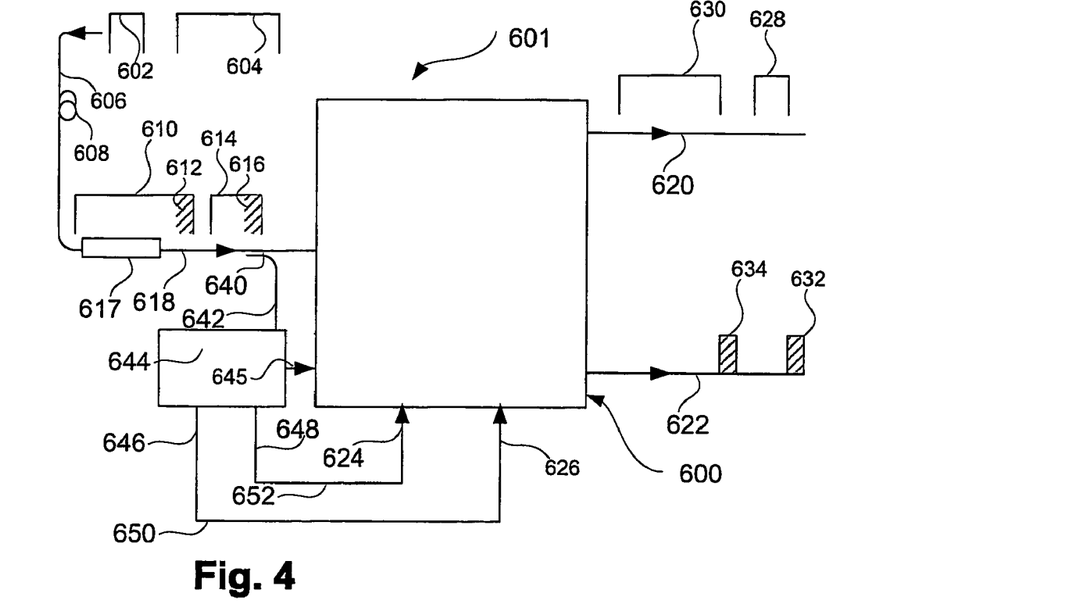
FIG. 4 is a schematic illustration of a dispersion correcting system for a single information channel including a chopper that may include variable chopping to be used with Non-Return-to-Zero (NRZ) modulation format and dynamic chopping control.

3. Dispersion Correction for Non-Return-to-Zero Modulation Format 3.1 Single Channel CD and PMD Correctors FIG. 4 illustrates CD and PMD corrector 601 including chopper 600. Chopper 600 may be of any type including any of the types mentioned above and in particular the type of chopper described in U.S. patent application entitled "All Optical Chopping For Shaping and Reshaping Apparatus And Method" (see background cross-reference) and illustrated there by FIGS. 6a, 6b, 7a, 7b, 13a-13c, 14a-14e, 15a, 16, 17, and 18. Correct 601 may include amplifier 617 connected in series to the input port of chopper 600. Radiation guide 606 having length represented by coil 608 carries high quality signals 602 and 604 generated by high quality modulator (not shown). Signals 602 and 604 may be the pulses of an information channel generated by Non-Return-to-Zero (NRZ) modulation format. Signals 602 and 604 may degrade along their travel in guide 606 and appear as respective broaden pulses 614 and 610 at input 618 of chopper 600 that may include tapping device 640. Pulses 610 and 614 include broaden portions 612 and 616, respectively, caused by any type of dispersions in guide 606.

Chopper 600 has two outputs 620 and 622. As explained in U.S. patent application entitled "All Optical Chopping For Shaping and Reshaping Apparatus And Method" (see background cross-reference) and illustrated there by FIGS. 6a, 6b, 7a, 7b, 13a-13c, 14a-14e, 15a, 16, 17, and 18, output 620 of chopper 600 receives the signal reflected back into input 618 of chopper 600 and is coupled from there, by a coupler or a circulator, into output 620. Thus we refer to output 620 as the reflecting output. Reflecting output 620 performs chopping and the width of the signals at reflecting output 620 illustrated by pulses 628 and 630 is equal to the width of respective signals 614 and 610 less a fixed amount of chopping determined by the setting of chopper 600. As explained in U.S. patent application entitled "All Optical Chopping For Shaping and Reshaping Apparatus And Method" (see background cross-reference) and illustrated there by FIGS. 17 and 18, chopper 600 is capable of performing variable chopping and the amount of chopping that chopper 600 produces may be selected by adjusting the positions (by variable optical delay lines) and or the gains of the NLE's that chopper 600 includes. Adjusting the gains of the NLE's of chopper 600 is performed by adjusting the current injected to these NLE's through injection-current terminals 624 and 626.

The amount of chopping that chopper 600 produces may be adjusted to be equal to broaden portions 612 and 616 of pulses 610 and 614, respectively. It should be understood that broaden portions 612 and 616 of pulses 610 and 614, respectively, are schematic illustration of the pulse broadening and indicate the width difference between the original width of respective pulses 604 and 602 and the width of pulses 610 and 614 broaden by dispersions, respectively. While the broaden portions 612 and 616 are illustrated as being only in the head parts of pulses 610 and 614, respectively, they may appear in the tails, in the heads, and in both the tails and the heads of pulses 610 and 614 as well.

Output 622 of chopper 600 receives signals 610 and 614 transmitted from input 618 and chopped by chopper 600. Thus we refer to output 622 as the transmitting output. Transmitting output 622 performs a fixed amount of chopping and the width of the signals at transmitting output 622 illustrated by pulses 632 and 634 is fixed and independent on the width of signals 610 and 614 at input 618 of chopper 600. However the width of signals (pulses) 632 and 634 is determined by the setting of chopper 600 as explained above with reference to U.S. patent application entitled "All Optical Chopping For Shaping and Reshaping Apparatus And Method" (see background cross-reference) and especially with reference to its FIGS. 17 and 18. Chopper 600 may be capable of performing variable chopping and the amount of chopping 632 and 634 that chopper 600 produces at port 622 may be adjusted to be equal to the width of broaden portions 616 and 612 caused by the optical dispersions, respectively. In NRZ modulation format, broaden portions 616 and 612 having the same width regardless of the width of original pulses 602 and 604 since the broadening, by optical dispersions, of original pulses 602 and 604 is the same no mater if the original signal is a single pulse or a train of multiple pulses forming a long block of logic ones.

In such a case, when the width of NRZ pulses 632 and 634 (representing the amount of chopping) is adjusted to be in the desired width, namely at the width of broaden portions 616 and 612, then chopper 600 produces, at port 622, chopping at the amount that is equal to the amount of broadening caused by the optical dispersions. In this case pulses 628 and 630 at reflecting port 620 of chopper 600 having the width of pulses 614 and 610 less an amount of chopping that is equal to the width of broaden portions 616 and 612, respectively. The PMD may vary statistically with time according to a Maxwellian distribution. This means that the width of broaden portions 612 and 616, caused by the optical dispersions, may vary statistically as well. Thus an effective dispersion correction may includes a dynamic chopping where the amount of chopping performed at reflecting port 620 may be adjusted dynamically to be equal to the amount of broadening 612 and 616 caused by the optical dispersions along guide 606. This means that for correcting effectively the broaden portions 612 and 616 caused by the dynamic dispersions, there may be a need for a dynamic adjustment of the amount of chopping of chopper 600 to be according to the broaden portions 612 and 616 of respective pulses 610 and 614 at input 618. In this case and when NRZ modulation format is used to carry the information in the information channel, reflecting output 620 produces dispersion correction by converting the width of NRZ pulses 610 and 614 back into widths that may be equal to the original widths of repspective NRZ pulses 604 and 602.

It should be understood that while broaden portions 612 and 616 may be at the heads, tails and both heads and tails of pulses 610 and 614, the chopping performed by chopper 600 for correcting the dispersions may be of the type of head, tail, and both head and tail chopping, regardless of the type of broadening of portions 612 and 616.

The ability of reflecting output 620 to accurately correct broaden portions 612 and 616 caused by dispersion of pulses modulated by NRZ modulation format, may depend on the efficiency of producing variable and dynamic chopping at reflecting output port 620. Variable chopping according to the width of broaden portions 612 and 614 may be performed with the assistance of measurement and control system 644.

Part of the energy of broaden signals 610 and 614 is tapped out from radiation guide 606, by coupler 640 and is directed into measurement and control system 644 by optical port 642. System 644 measures the width of broaden signals 610 and 614 and compares their width to the closest integral number of the original width of a single pulse, such as pulse 602. The width of the broaden portions 612 and 616 (broadening by the optical dispersions) is derived, by system 644, from the difference between the actual measured width of pulses 610 and 620 and the above closest integral number. The amount of chopping that chopper 600 has to produce may be controlled by system 644 to be equal to the value of broadening derived by system 644. System 644 may control the chopping either by controlling the location of the NLE in chopper 600 or by controlling the gains of the NLE's in copper 600.

System 644 may produce control signals to control an optical variable delay line in chopper 600 (not shown) to locate the NLE of chopper 600 (not shown) by adjusting the optical path of the variable optical delay line, such that, the chopping of chopper 600 may be equal to the amount of broadening caused by the optical dispersions.

In an alternative options, System 644 may produce control signals at ports 646 and 648 that are canied by leads 650 and 652 into injection-current ports 624 and 626, respectively, for controlling the gains of the NLE's (not shown) by adjusting the injection currents at ports 624 and 626 chopping of chopper 600 for producing an amount of chopping that may be equal to the amount of broadening caused by the optical dispersions.

3.2 CD and PMD Compensators for DWDM Systems

Figure 5:
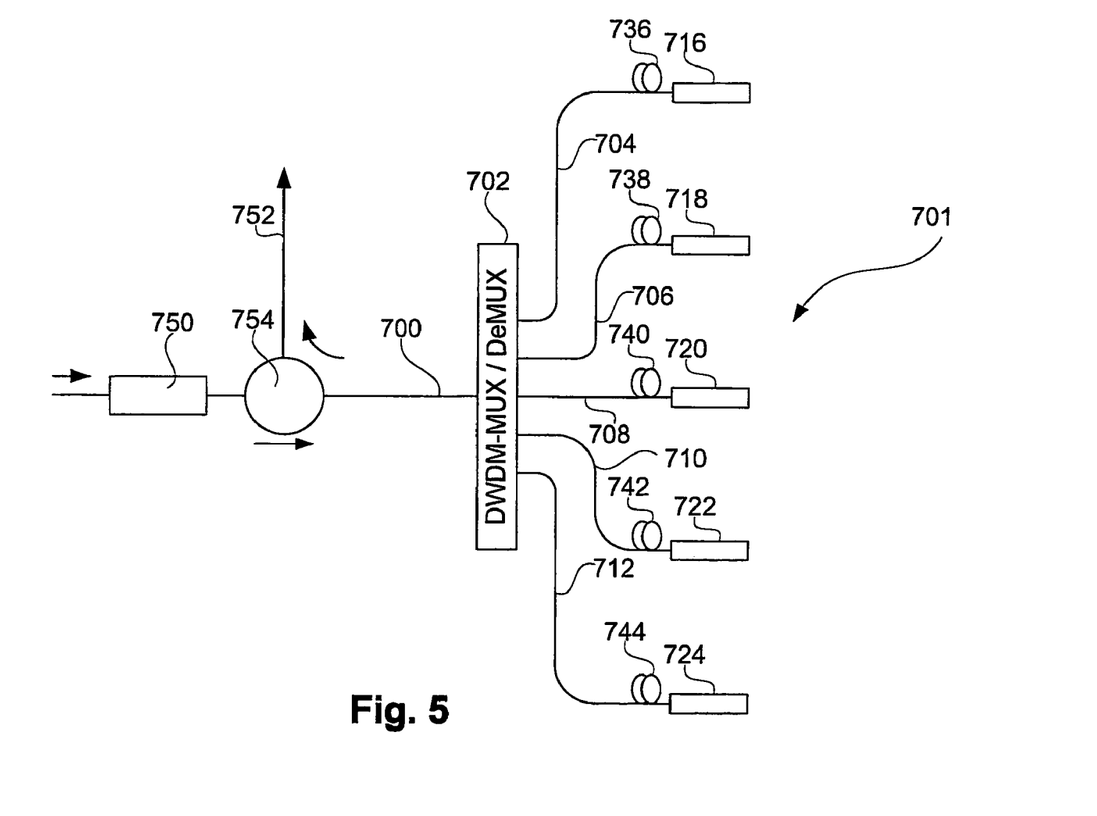
FIG. 5 is a schematic illustration of a system for correcting CD and PMD of multiple information channels including multiple choppers of FIG. 4 for multiple wavelengths in a DWDM configuration using multiplexing and demultiplexing by the same device.

FIG. 5 illustrates CD, PMD, or CD and PMD compensator system 701 for multiple channels, such as, DWDM system. System 701 may be designed especially for dispersion compensation of pulses modulated by NRZ format. Radiation guide 700 may carry pulses broaden by CD and PMD of multiple information channels corresponding to multiple wavelengths which are divided, by DWDM demultiplexer 702, into multiple ports 704, 706, 708, 710, and 712; each of them carries a single wavelength corresponding to a single information channel. Radiation guide 700 may include circulator 754 and optical amplifier 750 to compensate for the loss in guide 700, chopping loss, and demultiplexing loss caused by demultiplexer 702. Ports 704, 706, 708, 710, and 712 include pulse choppers 716, 718, 720, 722, and 724, respectively, each of them may be of the type of chopper 600 illustrated by FIG. 4. In this case and for NRZ format, each of ports 704, 706, 708, 710, and 712 is analogue and similar to input 618 of chopper 600 in FIG. 4 and the broaden pulses chopped by choppers 716, 718, 720, 722, and 724 are reflected, with their narrower form, back into radiation guides 704, 706, 708, 710, and 712 that each of them is analogue and similar to reflecting output 620 and or input 618 of chopper 600 when the chopped signal is reflected back into input 618 of chopper 600 in FIG. 4. Radiation guides 704, 706, 708, 710, and 712 may include delay-lines 736, 738, 740, 742, and 744, respectively. In a situation of dispersion compensation for pulses modulated by NRZ format, the narrower chopped pulses reflected back into guides 704, 706, 708, 710, and 712 may have a width that is equal to the original width of the NRZ pulses prior to their broadening due to optical dispersions. These chopped signals reflected back along guides 704, 706, 708, 710, and 712 toward DWDM demultiplexer 702 that operates, in the propagation direction of the reflected chopped pulses as multiplexer 702. Accordingly, the chopped pulses reflected back into radiation guides 704, 706, 708, 710, and 712 are recombined by DWDM multiplexer 702 (or demultiplexer 702 in the other direction) that recombines the separated channels from guides 704, 706, 708, 710 and 712 back into a single fiber 700.

In case that the multiplexing by multiplexer (combiner) 702 should be done in a certain time sequence between the different channels arriving from guides 704, 706, 708, 710, and 712, respective delay-lines 736, 738, 740, 742, and 744 may be included in the corresponding guides to adjust the desired arrival time of each channel received from these guides.

Each of choppers 716, 718, 720, 722, and 724 at ports 704, 706, 708, 710, and 712, respectively, operates in the channel that it belong to as a compensator for CD and PMD for a single channel as illustrated and explained above for choppers 30, 66, and 106 of FIGS. 1a-1c. In case that NRZ modulation format is used and choppers 716, 718, 720, 722, and 724 are of the type of chopper 600 of FIG. 4, only inputs 704, 706, 708, 710, and 712 that are the analogue of input 618 (and, at the same time are the analogue of reflecting output 622 as well) of chopper 600 of FIG. 4 are used and shown. The reflecting outputs and the transmitting outputs that are the analogue of reflecting output 620 and transmitting output 622 are not in use and thus are not shown by the illustrations of choppers 716, 718, 720, 722, and 724.

It can be seen that CD, PMD, or CD and PMD compensation system 701 receives, at its input 700, multiple information channels including broaden pulses at multiple wavelengths and system 701 reflects, back into its input 700, reshaped narrower pulses corresponding to the pulses that it receives at its input 700.

The reshaped narrow pulses corrected for the optical dispersions are directed out of radiation guide 700, by circulator 754, into radiation guide 752 for further propagation.

4. CD and PMD Compensators at Splitting and Combinig Points

Figure 6A:
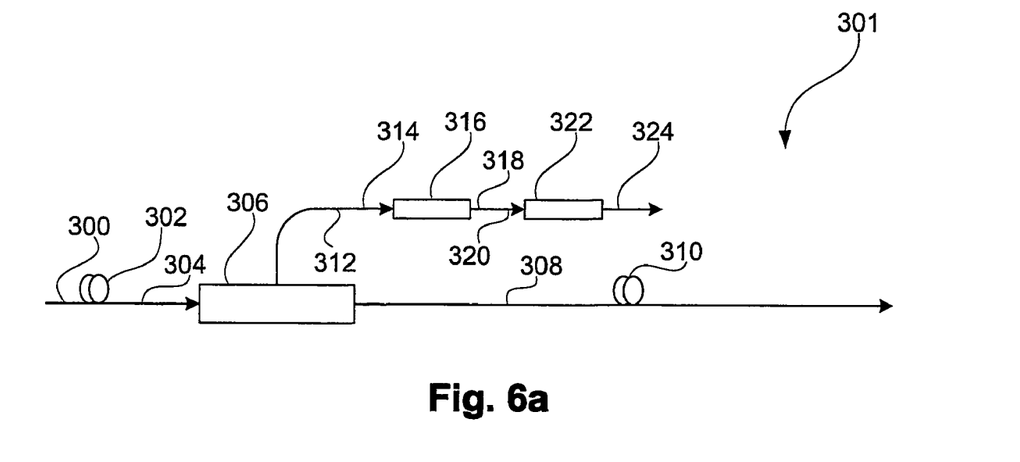
FIGS. 6a and 6b illustrate systems for correcting CD and PMD of an information channel in a DWDM system using ADD and DROP devices.
Figure 6B:
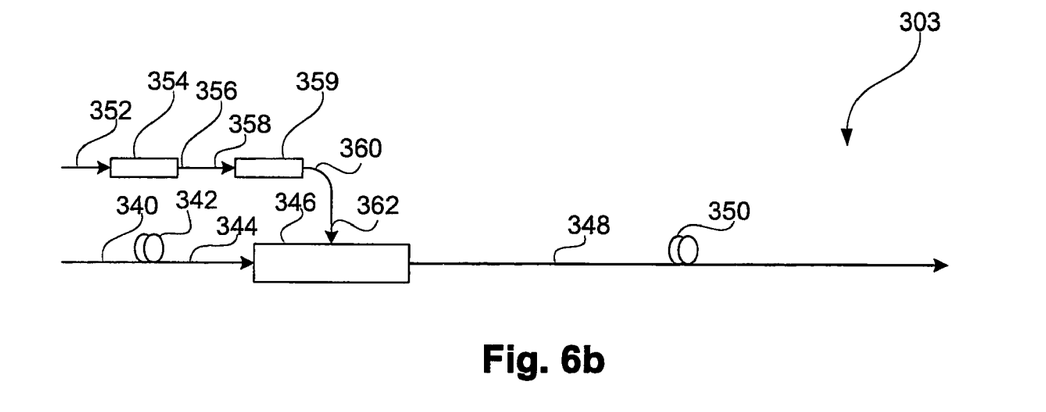

FIGS. 6a and 6b illustrate CD and PMD compensators in the vicinity of ADD and DROP devices. The splitting points where ADD and DROP devices are used are very attractive for installing CD and PMD compensators 303 and 301 of FIGS. 6b and 6a, respectively. The ADD and DROP devices 346 and 306 of FIGS. 6b and 6a, respectively, already serve as channel combiner and channel separator and may save the need for a special combiner (multiplexer) or demultiplexer such as multiplexer 246 and demultiplexer 202 of FIG. 3 that are used for channel separation and combining, respectively.

FIG. 6a illustrates CD and PMD compensator 301 including radiation guide 300 that its length is represented by coil 302. Guide 300 carries multiple information channels at multiple wavelengths received by input 304 of DROP device 306. Device 306 separates one of the information channels out into radiation guide 312 and from there into chopper 316. The pulses of the single separated (dropped) wavelength channel, are received at input 314 of device 306 after being broadened by CD and PMD. Chopper 316 reshapes each of the pulses of the separated channel received from device 306 via guide 312 and converts them into narrower pulses at its output 318. The pulses from output 318 may be received at input 320 of amplifier 322 to be amplified, by amplifier 322, in order to produce amplified and narrow pulses at output 324. The rest of the channels (all the channels except the separated channel in guide 312) continue to propagate in guide 308 that its length is illustrated by coil 310.

FIG. 3b illustrates CD and PMD compensator 303 including radiation guide 340 that its length is represented by coil 342. Guide 340 carries multiple information channels at multiple wavelengths received by input 344 of ADD device 346. Chopper 354 receives from radiation guide 352 pulses broaden by CD and PMD and reshapes each pulse by narrowing their width back into their original width as initially produced (before broadening). The reshaped pulses received from output 356 of chopper 354 may be received at input 358 of amplifier 359 to be emitted, from output 360 of amplifier 359, as narrow and amplified pulses propagating in radiation guide 362. Accordingly, the pulses of the channel received from guide 362 are compensated for the CD and the PMD. Device 346 adds the information channel from radiation guide 362 to combine this channel with the other channels received at input 344 and to emit all these channels together from ADD device 346 and into radiation guide 348 that its length is schematically illustrated by coil 350.

5. Improved Detection

The detection of the signals in the optical information channel is synchronized, at the receiver side, by a synchronization system known as clock recovery system. In a synchronized situation the information pulses are sampled at each time slot of the clock, at the receiver side, for detecting the binary information carried by the optical channel. In a situation where the optical information pulses are broaden by the optical dispersions, they appear in the time slots where they should appear and in addition they may occupy time slots in which they should not appear which are adjacent to the time slots in which they should appear. In this case, the time slots that should not include any energy of the information pulses actually include such energy of the information pulses due to the broadening of the optical dispersions. This may result with poor detection having high Bit Error Rate (BER). When the broadening of the information pulses, caused by the optical dispersions is large, it may cause to some of the information pulses that should be separated by at least one vacant time slot to be joined together by occupying the vacant time slots with energy of the information pulses in a process known as Inter Symbol Interference (ISI) which results with a high Bit Error Rate (BER).

Accordingly it is clear that the broadening of the information pulses, by the optical dispersions, causes to increase in the BER. The lower the BER the better is the detection.

5.1. Improving Detection by Chopping

Referring now to FIGS. 7a-7e that are illustrated with respect to reference time 800 and time axis 802.

Figure 7A:
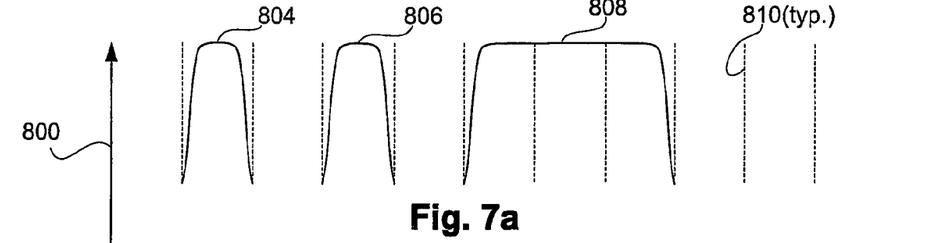
FIG. 7a schematically illustrates information pulses modulated by NRZ format and their respective time slots.

FIG. 7a illustrates information pulses 804, 806, and 808 modulated by NRZ modulation format that fit into time slots 810 (typ.).

Figure 7B:
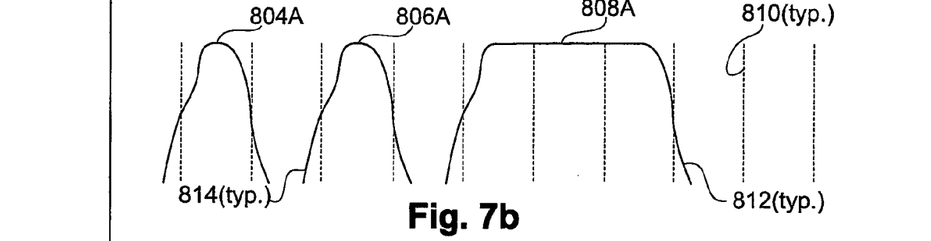
FIG. 7b schematically illustrates the information pulses shown by FIG. 7a after being broadened by dispersions.

FIG. 7b illustrates pulses 804A, 806A, and 808A that are pulses 804, 806, and 808 of FIG. 7a, after being broadened by optical dispersions. Pulses 804A, 806A, and 808A are shown with respect to same time slots 810 (typ.) shown in FIG. 7a. Each of pulses 804A, 806A, and 808A has a typical head broadening 812 (typ.) and tail broadening 814 (typ.). The head and tail broadening 812 (typ.) and 814 (typ.), respectively, may be mistakenly detected as logic state "1" while in the time slots that they appear the logic state should be "0". Accordingly, broadenings 812 (typ.) and 814 (typ.) may increase the BER and degrade the detection quality.

5.1.1. Improving Detection by Head and Tail Chopping

Figure 7C:
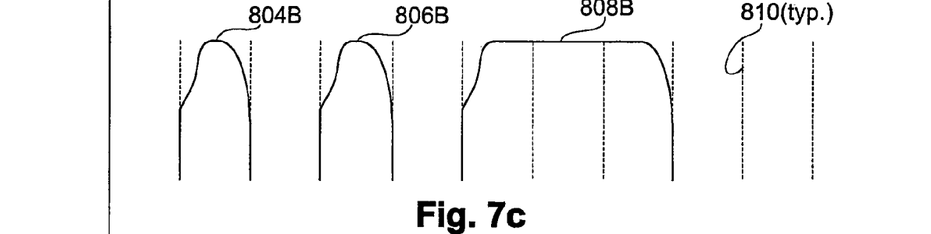
FIGS. 7c, 7d, and 7e are schematic illustrations of the pulses of FIG. 7b that are corrected by chopping of both head and tail, head, and tail, respectively.

FIG. 7c shows pulses 804B, 806B, and 808B, that are pulses 804A, 806A, and 808A of FIG. 7b, after each of them was head and tail chopped by the amount of head and tail broadening 812 (typ.) and 814 (typ.) (shown in FIG. 7b), respectively. Pulses 804B, 806B, and 808B are shown with respect to same time slots 810 (typ.) shown in FIG. 7a. It can be seen that same time slots 810 (typ.) fits the information pulses 804, 806, and 808 of FIG. 7a prior to the dispersions and pulses 804B, 806B, and 808B of FIG. 7c that are pulses 804A, 806A, and 808A after head and tail broadening which were corrected by proper head and tail chopping.

It can be seen that pulses 804B, 806B, and 808B, and 804, 806, and 808 are well fitted into their same respective time slots 810 (typ.). Accordingly, the detection of pulses 804B, 806B, and 808B broaden by dispersions and corrected by head and tail chopping may be similar to that of original pulses 804, 806, and 808 of FIG. 7a prior to the broadening by dispersions. This means that the head and tail chopping improves the detection quality.

5.1.2. Improving Detection by Head Chopping

Figure 7D:
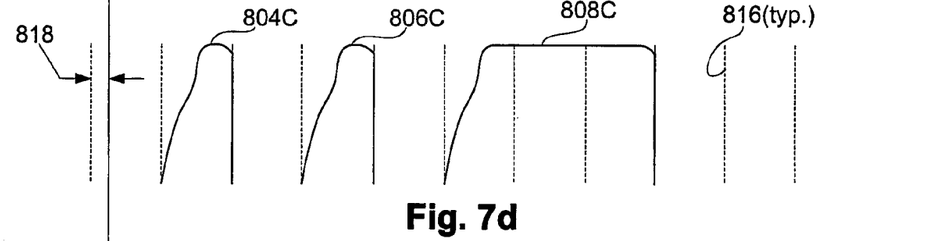

FIG. 7d illustrates pulses 804C, 806C, and 808C which are pulses 804A, 806A, and 808A of FIG. 7b, after each of them was head chopped by the amount that is equal to the sum of head and tail broadening 812 (typ.) and 814 (typ.) (shown in FIG. 7*b*). Pulses 804C, 806C, and 808C are shown with respect to time slots 816 (typ.).

It can be seen that time slots 810 (typ.) that fit the information pulses 804, 806, and 808 of FIG. 7*a* prior to the dispersions, and time slots 816 (typ.) of pulses 804C, 806C, and 808C of FIG. 7*d* that are pulses 804A, 806A, and 808A after head and tail broadening which were corrected only by proper head chopping, are shifted relative to each other by the amount marked 818. The whole amount of broadening which is equal to the sum of head and tail broadening 812 (typ.) and 814 (typ.), respectively, is corrected only by head chopping that is equal to the total broadening.

In this case the shifting 818 between time slots 810 (typ.) (aligned with reference 800) and 816 (typ.) is equal only to the typical tail broadening 814 (typ.) because the contribution of head broadening 812 (typ.) shown in FIG. 7*b* to the total broadening should be corrected by head chopping. Thus only the part of the chopping that is equal to tail broadening 814 (typ.) contributes to shifting 818.

Shifting 818 between time slots does not disturb the detection since the receiver includes a clock recovery system that synchronizes the clock of the receiver with the pulses that the receiver receives.

It can be seen that time slots 816 (typ.) and 810 (typ,) have the same period and the information pulses that they contain 804C, 806C, and 808C and 804, 806, and 808, respectively, are well fitted into their respective time slots. Thus the detection of information pulses 804C, 806C, and 808C broaden by dispersions and corrected by proper head chopping may be similar to that of original pulses 804, 806, and 808 of FIG. 7*a* prior to the broadening by dispersions. This means that pulses broaden by dispersions and corrected by chopping are detectable better.

5.1.3. Improving Detection by Tail Chopping

Figure 7E:
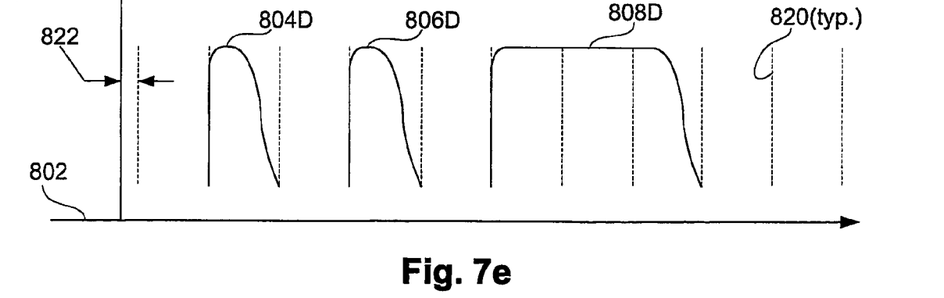

FIG. 7*e* illustrates pulses 804D, 806D, and 808D which are pulses 804A, 806A, and 808A of FIG. 7*b*, after each of them was tail chopped by the amount that is equal to the sum of head and tail broadening 812 (typ.) and 814 (typ.) (shown in FIG. 7*b*). Pulses 804D, 806D, and 808D are shown with respect to time slots 820 (typ.).

It can be seen that time slots 810 (typ.) that fit the information pulses 804, 806, and 808 of FIG. 7*a* prior to the dispersions and time slots 820 (typ.) of pulses 804D, 806D, and 808D of FIG. 7*e* that are pulses 804A, 806A, and 808A of FIG. 7*b* broaden by head and tail broadening which were corrected only by proper tail chopping, are shifted relative to each other by the amount marked 822. The whole amount of broadening which is equal to the sum of head and tail broadening 812 (typ.) and 814 (typ.), respectively, is corrected only by tail chopping that is equal to the total broadening.

In this case the shifting 822 between time slots 810 (typ.) (aligned with reference 800) and 816 (typ.) is equal to the typical head broadening 812 (typ.) because the contribution of tail broadening 814 (typ.) shown in FIG. 7*b* to the total broadening should be corrected by tail chopping. Thus only the part of the chopping that is equal to head broadening 812 (typ.) contributes to shifting 822.

Shifting 822 between time slots 810 (typ.) and 820 (typ.) does not disturbed the detection since the receiver includes a clock recovery system that synchronizes the clock of the receiver with the pulses that the receiver receives.

It can be seen that time slots 820 (typ.) and 810 (typ,) have the same period and the pulses that they contain 804D, 806D, and 808D and 804, 806, and 808, respectively, are well fitted into their respective time slots. This means that the detection of pulses 804D, 806D, and 808D broaden by dispersions and corrected only by tail chopping may be similar to that of pulses 804, 806, and 808 of FIG. 7*a* prior to the broadening by dispersions. Accordingly, pulses broaden by dispersions that corrected by chopping are detectable better than broaden pulses.

Thus BER may be reduced significantly by reducing the broadening effect caused by the optical dispersions in a process of reshaping the information pulses by chopping. The devices and the systems according to the present invention illustrated by FIGS. 1-6*b* are all of the type that reshapes the information pulses, broaden by the optical dispersions, by narrowing these pulses and chopping them back into a width that is similar to their original width prior to the broadening by dispersions. The optical choppers used to correct dispersions, according to the present invention, may include Non Linear Elements (NLE's) that are optical amplifiers. In this situation, these optical amplifiers and other optical amplifiers may compensate for the energy lost in the process of the chopping.

These types of reshaping and chopping performed by the embodiments according to the present invention results with improving the detection and reducing the BER of the detected information pulses carried by the information channels.

Any or all of the embodiments of the present invention, as described above, may include a continuous sequence of optical components connected by light guiding media such as, for example, optical fibers, planar waveguides, or planar circuits (PLC), which media may be fabricated using integrated optic techniques and/or on-chip manufacturing. Alternatively, All the embodiments according to the present may be constructed from discrete components, in which case the optical guiding media may be replaced by open space, e.g., vacuum, or by a non-solid, e.g., gaseous media, and the directional couplers may be replaced with beam splitters. It should be understood that all amplifiers and attenuators may include variable and/or adjustable components. It should be clear that all amplifiers may made of amplifying media and devices and in particular are made of SOA's, LOA's and EDFA's. It should be appreciated that all attenuators are made of attenuating media and devices and in particular are made of couplers and absorbing amplifiers.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An all-optical system for correcting optical dispersions, the system comprising:
    a dense wavelength division multiplexing (DWDM) device having an input, to receive at least one optical information channel carrying a first signal that is broadened by optical dispersions corresponding to said at least one optical information channel, and at least one output, to redirect said broadened first signal; and
    at least one optical self-chopping device having an input, a transmitting output, a reflecting output, and an optical loop including a non-linear element (NLE), to receive at said input the broadened first signal from the at least one output of the DWDM device, and to perform a chopping operation to produce a second signal at said transmitting output and a third signal at said reflecting output, said second and third signals each having a width that is narrower than the width of said broadened first signal, wherein said second signal at the transmitting output has a constant width that is independent of the width of said broadened first signal, wherein said third signal at the reflecting output has a width that is narrower than the width of said broadened first signal by a controllable amount that is independent of the width of said broadened first signal, and wherein the widths of said second and third signals are controllable by an adjustment of said NLE, said adjustment selected from the group consisting of adjusting the position of said NLE and adjusting the gain of said NLE, wherein said broadened first signal and said reflected third signal propagate in opposite directions in said input of the DWDM device, and wherein said system is able to correct multiple types of optical dispersions selected from the group consisting of chromatic dispersions, polarization-mode-dispersions, first order polarization-mode-dispersions, and second order polarization-mode-dispersions.

2. The system of claim 1 wherein said second signal and said third signal each have reduced inter symbol interference and are each detectable with a lower bit error rate than said broadened first signal.

3. The system of claim 1 wherein said second signal and said third signal each have reduced inter symbol interference and are each detectable with a lower power penalty than said broadened first signal.

4. The system of claim 1 wherein said DWDM device operates in a first direction as a wavelength division demultiplexing device for directing said optical information channel into said input of said optical self-chopping device, and operates in a second direction as a wavelength division multiplexing device for receiving said third signal.

5. The system of claim 1 wherein said NLE operates as an optical amplifier for amplifying said second and third signals to compensate for energy lost by said chopping operation.

6. The system of claim 5 wherein said NLE is selected from the group of optical amplifiers consisting of solid state optical amplifiers, linear optical amplifiers, erbium doped fiber amplifiers, and Raman amplifiers.

7. The system of claim 1 wherein said optical self-chopping device includes a threshold mechanism.

8. The system of claim 7 wherein said threshold mechanism is variable.

9. The system of claim 1 wherein said first signal has a non-return-to-zero modulation format.

10. The system of claim 1 wherein said first signal has a return-to-zero modulation format.

11. The system of claim 1 further comprising a monitoring unit for detecting the width of said first signal.

12. The system of claim 11 further comprising a control unit arranged to adjust the amount of chopping produced by said optical self-chopping device in response to said width of said first signal.

13. The system of claim 12 wherein said first signal has a non-return-to-zero modulation format.

14. The system of claim 1 wherein said optical self-chopping device is also an optical shaping device.

15. The system of claim 1 wherein said optical self-chopping device is also an optical reshaping device.

16. The system of claim 1 further comprising a DWDM combiner having at least one input and one output, wherein said at least one input of the DWDM combiner is associated with the transmitting port of said at least one optical self-chopping device, for directing said second signal from the transmitting port to said output of said DWDM combiner.

17. The system of claim 16 wherein said first signal has a return-to-zero modulation format.

18. The system of claim 1 wherein said input of said DWDM device further includes a coupling device for receiving said third signal, reflected back into the input of said DWDM device from the reflecting port of said at least one optical self-chopping device, and coupling said third signal out of said input of the DWDM device.

19. The system of claim 18 wherein said coupling device is a circulator.

20. The system of claim 18 wherein said first signal has a non-return-to-zero modulation format.

21. The system of claim 1 wherein said chopping operation is selected from the group of chopping types consisting of head chopping, tail chopping, and head and tail chopping.

22. The system of claim 21 wherein said chopping type is selectable according to the position of said NLE in the optical loop of said optical self-chopping device.

23. The system of claim 1 wherein said NLE includes an electrical terminal for receiving an injected electrical-current, and wherein adjusting the gain of said NLE includes adjusting the electrical current injected into said electrical terminal of the NLE.

24. The system of claim 1 wherein said optical self-chopping device is arranged to produce said second signal at a second spectral width and said third signal at a third spectral width that are each narrower than a first spectral width of said broadened first signal, for improving the quality of said second and third signals to allow further propagation of said second and third signals with reduced broadening caused by further optical dispersions.

* * * * *